Aug. 31, 1943.         D. G. GRISWOLD         2,328,009
CHECK VALVE
Original Filed May 1, 1940
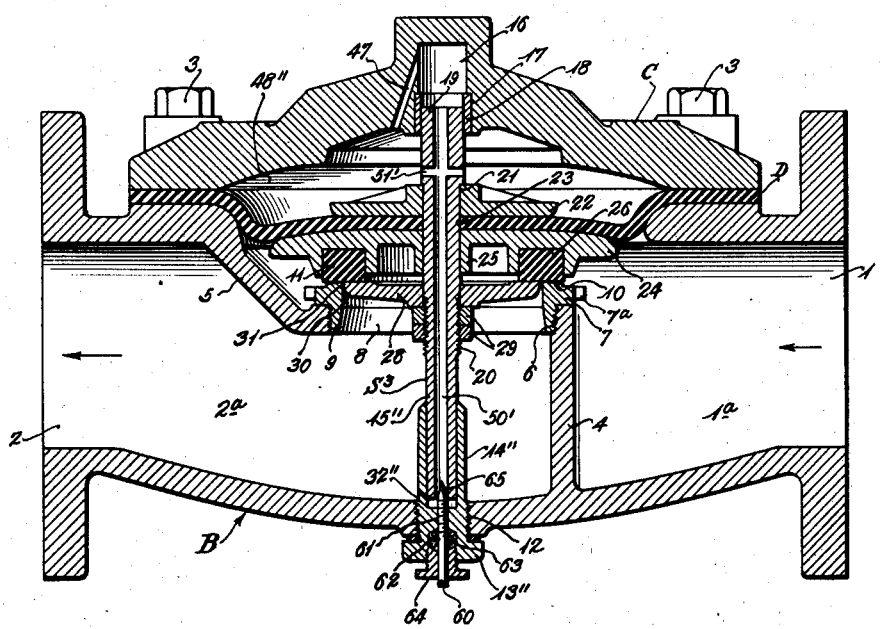
Inventor
Donald G. Griswold
By Bacon & Thomas
Attorneys Patented Aug. 31, 1943

2,328,009

UNITED STATES PATENT OFFICE 2,328,009

CHECK VALVE

Donald G. Griswold, Alhambra, Calif., assignor to Clayton Manufacturing Company, Alhambra, Calif.

Original application May 1, 1940, Serial No. 332,823. Divided and this application February 2, 1943, Serial No. 474,446

5 Claims. (Cl. 137—153)

The present invention relates to check valves, and more particularly to a self-governing check valve designed to operate efficiently and quietly, and to open automatically whenever the pressure on the inlet side of the valve is greater than that on the outlet side of the valve and to close automatically when these pressure conditions are reversed.

One of the most common objections to known types of check valves is that they have a tendency to slam closed whenever there is an interruption of flow or change in pressure. Such valves are usually constructed so that the closing member or valve disc, whether it be hinged or movable bodily, travels in a direction opposite to that of the normal flow of fluid to effect closing of the valve. In other words, the closing member travels in the same direction as the attempted return flow of fluid and the inertia of the fluid causes the disc to slam or suddenly strike against its seat. It is this sudden seating, resulting in the sudden stopping of the moving return stream, that sets up a back surge or a knock producing what is commonly referred to as "line shock" or "water hammer." Aside from the undesirable noise incident to hammering, there is the more serious danger of the pipe bursting from sudden excess pressure or breaking as the result of vibratory strains imposed by repeated shock. This situation commonly occurs when a conventional check valve is used at the end of a long water line. Furthermore, when such check valve is used at the discharge of a pulsating pump, the valve disc is caused to strike at its seat with every pulsation of the pump, producing frequent and repeated hammerlike blows on the valve disc and seat which quickly destroy the valve. The objection and danger increase, of course, with the size of the valve.

In contrast, the check valve of the present invention is constructed so that, regardless of size, it is impossible for the return flow to slam the valve shut and produce hammering or line shock. While in previous valves, the closing member has been directly urged against its seat by the attempted return flow and the closing member has thus been caused to travel in the same direction as the return flow, the closing member of the valve of the present invention is positively moved in a direction opposite to and against such flow to effect closing of the valve. Stated differently, the closing member of the present valve actually cuts off flow by moving in the same direction as that of the fluid normally flowing through the valve. The operation of the closing member of the present check valve is independent of the back surge or return flow, and contrary to the action of other valves, it does not suddenly cut off the return flow but does act directly thereon, closing slowly and positively at such a rate as to gradually cut off the return flow; thereby avoiding damage to the valve and the pipe line.

One important advantage of the above action is that in a pulsating line, the valve disc or closing member normally does not have sufficient time to respond to the rate of flow change and it, therefore, remains partially or fully open without the disc touching the seat on every pulsation of the pump, as is the case with an ordinary type of check valve. In normal operation the present valve is either fully open or fully closed. The fact that the valve is always wide open when the flow is in the normal direction constitutes a desirable advantage, in that it reduces the resistance to the flow of liquid and, therefore, results in lower pumping costs.

Valves constructed in accordance with the present invention operate upon a pressure differential in the inlet and outlet sides of the valve. The valve disc or closing member of the valve is operated by a diaphragm which is responsive to the difference in pressure. Means is associated with the outlet chamber of the valve for controlling the rate of flow of the pressure fluid to the diaphragm chamber. This control means is arranged so that the valve disc operates at two speeds, i. e., it may move rapidly toward its seat during the major portion of its travel and move at a comparatively slower rate during the remainder of its travel to effect a generally quick closing and a gradual throttling of the return flow during the final closing of the valve.

The primary object of the invention is to provide a check valve which will be free from the above noted objections and which will have the advantage of controlling the flow of water or other liquid without producing chattering, line shock or hammering. These objections are overcome and the advantages obtained by providing a check valve whose closing action is definitely controlled so as to preclude line shock and hammering.

One of the important objects of the invention is to provide a check valve of the diaphragm type which is automatically responsive to the pressure of the medium passing therethrough and which will close quietly against any return flow with a governed closing action.

Another object of the invention is to provide a check valve which will close quickly through a major portion of its closing movement and which will complete the closing movement relatively slowly; and further, which can be reopened to its fullest extent without undue delay.

Still another object of the invention is to provide a pressure operated check valve in which the stem of the valve is utilized, in conjunction with suitable ports, as a means for governing or regulating the flow of pressure fluid to a chamber to control the opening and closing of the valve.

A further object of the invention is to provide a check valve with a guided valve disc and a cooperating seat and choke-washer arranged to eliminate noise during opening and closing.

Another object of the invention is to provide a check valve construction in which the period of closing of the valve may be adjusted or varied as desired to meet specific conditions; for example, in certain installations employing large diameter pipe lines of great length and valves of large size, a total closing period of one to two minutes or more may be necessary to cut off flow without producing line shock or hammering.

A further object of the invention is to provide a check valve which is positive in its operation and which will not waver or flutter between open and closed positions, but which in normal operation will be either completely closed or fully open; complete closing avoiding undesirable leakage through the valve, and full opening enabling the valve to operate with maximum efficiency without restricting or impeding flow therethrough.

A still further object of the invention is to provide an automatic check valve which is comparatively simple in construction, relatively inexpensive to manufacture, and which requires no substantial servicing.

Other and further objects of the invention will be apparent from the following description taken in connection with the accompanying drawing in which the single figure illustrates an automatic check valve of the diaphragm type provided with an adjustable needle valve to reduce the flow of pressure fluid through the valve stem into the diaphragm chamber as the valve disc approaches its limit of closing travel, whereby the closing rate of the valve can be varied as desired.

Referring now to the drawing, the letter B indicates the valve body and the numerals 1 and 2, respectively, indicate the inlet and outlet sides of the valve. The letter C indicates the cap of the valve and the letter D indicates a circular diaphragm whose marginal portion is clamped between the body B and the cap C by any suitable number of cap screws 3.

The body B is provided at its inlet side 1 with a substantially vertical partition wall portion 4 forming an inlet chamber 1ª, and an annular wall portion 5 which cooperates with the wall 4 to form an outlet chamber 2ª. The wall portions 4 and 5 are merged to provide a circular opening 6 which is threaded and adapted to receive an annular valve seat 7. The valve seat 7 is provided with a circular opening 8 which flares outwardly toward the bottom of the valve body as indicated at 9. The upper surface of the valve seat 7 adjacent the opening 8 is provided with a declining beveled portion 10 adapted to cooperate with a valve disc 11 to form a leak-proof seal as will be explained more fully hereinafter. The valve seat 7 is further provided with circumferential projections 7ª adapted to be engaged by a spanner wrench for tightly securing the seat in the threaded opening 6.

The valve body B has a threaded opening 12 axially aligned with the opening 8 in the valve seat 7. An elongated plug 13″ is threaded into the opening 12 and includes a tubular guide portion 14″ for one end 15″ of a valve stem S³. The cap member C also has a recess 16 counterbored at 17 to receive a guide bushing 18 for the upper end 19 of the valve stem S³. The recess 16 is located in the cap member C so that it is axially aligned with the tubular guide portion 14″ and the opening 8 of the valve seat 7.

The valve stem S³ has a threaded portion 20 intermediate its lower end 15″ and its upper end 19. The end 15″ is of slightly less diameter than the threaded portion 20 and a snug sliding fit in the tubular guide portion 14″ of the plug 13″. The upper end 19 of said valve stem is enlarged to provide a shoulder at 21 and, moreover, is snugly guided in the bushing 18. Thus, the plug 13″ and the bushing 18 are arranged to guide the valve stem S³ during vertical movement.

An upper diaphragm supporting plate 22 is adapted to be received upon the stem S³ and to abut the shoulder 21 with the upper side thereof. The upper side of the diaphragm D is engaged with the lower side of the plate 22 and is provided with an aperture 23 through which the valve stem S³ extends. The lower side of the diaphragm D is adapted to engage the upper side of a lower diaphragm supporting plate 24, and the valve stem S³ extends through a central boss 25 in said plate. The lower supporting plate 24 is also provided with a channel 26 formed in the lower side thereof to receive the valve disc 11 previously referred to. A combined clamping member and choke-washer 28 is adapted to be mounted upon the stem S³ and to engage the inner marginal portion of the valve disc 11. Clamping nuts 29 are threaded upon the portion 20 of the valve stem S³ and serve to retain the valve stem, the diaphragm supporting plates 22 and 24, the valve disc 11, and the choke-washer 28 in assembled relation with the diaphragm D.

The outer diameter of the clamping member or choke-washer 28 is preferably only slightly less than that of the opening 8 in the valve seat 7. In a six inch valve, for example, the minimum radial clearance may be only three or four thousandths of an inch. The peripheral portion of the choke-washer 28 is preferably rounded, as indicated at 30, and is tapered outwardly and upwardly from said rounded portion to substantially its upper outer edge as indicated at 31. The rounded and tapered peripheral portions of the choke-washer 28 serve to gradually cut off the flow through the opening 8, and the beveled portion 10 of the valve seat 7 cooperates with the valve disc 11 to reduce eddying and to form a theoretical line-contact seal, whereby quiet, smooth and chatterless operation of the valve is obtained.

The tubular guide 14″ for the lower end of the valve stem S³ is pierced by one or more transverse openings 32″ arranged to establish communication between the outlet chamber 2ª of the valve and the interior of said guide. The valve stem S³ is provided with a longitudinal passageway 50′ and an intersecting transverse passageway 51′. The passageway 50′ preferably extends throughout the length of the valve stem S³, and the passageway 51′ extends through the valve stem at a point slightly above the clamping member 22, so that the passageway 51′ opens into the diaphragm pressure chamber 48″.

In order to control the action of the valve, and particularly its final closing movement, a needle valve 60 is provided to throttle the entrance of fluid into the passageway 50' to slow up the closing movement of the valve and thereby prevent the same from slamming shut. The needle valve 60 is associated with the plug 13" which has a threaded bore 61 in which the needle valve 60 is adjustably mounted. The stem 62 of the needle valve is surrounded by packing 63 and a packing gland 64 is threaded into the plug 13" to compress the packing against said stem and thereby prevent leakage of fluid from the valve.

The closing action of the valve can be nicely regulated because of the variability of the restricted flow afforded by the needle valve 60. Thus, the flow to the diaphragm chamber 48" will be comparatively rapid until the valve stem S³ reaches a position such that the point of the needle valve 60 enters the passageway 50'. Inasmuch as the end of the needle valve 60 is tapered, as indicated at 65, continued downward movement of said stem relative to said needle valve will gradually decrease the supply of pressure fluid to the diaphragm chamber 48" and thereby slow up the closing action of the valve toward the end of its closing movement.

The operation of the main valve is otherwise as follows: Let it be assumed that the outlet side 2 of the valve is connected with a pipeline, pipe system, or other apparatus in which it is desired to maintain a given pressure or pressure head. Let it be further assumed that the pressure in the outlet chamber 2ª of the valve has dropped below the given pressure and below that in the inlet opening 1ª. It will then be apparent from the foregoing description that a corresponding pressure drop will occur in the diaphragm chamber 48" through the return of fluid from said chamber through the passageway 50' in the valve stem S³, and the port 32" in the guide 14". This exhaust or return of fluid from the diaphragm chamber 48" is facilitated by the pressure of the fluid in the inlet chamber 1ª acting upwardly upon the plate 24 and the lower side of the diaphragm D tending to bodily raise the valve stem S³ and lift the valve disc 11 from its seat to open the valve. After the valve has opened slightly, the pressure in the inlet chamber 1ª will become effective upon the choke-washer 28 and produce a further differential pressure effective to open the valve. It will be noted that the initial rate of opening of the valve is slow due to the throttling effect of the needle valve 60. However, as the valve stem S³ starts to rise, the fluid can escape more rapidly from the chamber 48" through the passageways 50' and 51' in the valve stem S³ and the port 32" in the guide 14" and escape into the outlet chamber 2ª. In view of the fact that the passageways 51', 50', and the ports 32" are of fairly large size, the fluid can be forced out of the diaphragm chamber 48" at a rapid rate to thereby permit quick opening of the valve. Any fluid in the recess 16 will, of course, be forced through the passage 47 by the end 19 of the valve stem S³. With further respect to the closing action of the valve, it will be understood that when a static pressure in excess of the inlet pressure prevails on the outlet side 2 of the valve, or the desired dynamic pressure has been attained on the outlet side of the valve, pressure will have been built up correspondingly in the diaphragm chamber 48" by virtue of the fact that fluid under pressure passes from the outlet chamber 2ª through the ports 32" in fairly large volume to effect a quick closing of the valve through a major portion of the travel of the valve stem S³. However, and as previously explained, as the lower end 15" of the valve stem approaches the needle valve 60, the rapid supply of fluid to the diaphragm or pressure chamber 48" will be gradually cut off, and the continued closing of the valve or downward movement of the valve stem S³ will then proceed at a slower rate to effect the final closing movement of the valve because of the comparatively reduced rate of flow of pressure fluid to the diaphragm chamber past the needle valve 60. It will be understood that the rate of restricted flow to the diaphragm chamber 48" may be governed or varied as desired by proper adjustment of the needle valve 60.

During both the opening and the closing of the valve the valve disc 11 is guided by the stem S³ so that it uniformly disengages and contacts the face of the seat 7. The guiding of the valve disc 11 is important, especially during closing, because if the valve disc is not constrained it will seat upon one side first and a squeal or a noise comparable to "razzing" will result as it finally seats on the other side and cuts off the flow. Moreover, closing of the valve against the flow of the return stream instead of closing in the same direction with such flow eliminates slam and the hammering incident to the sudden checking of such return flow. The choke-washer 28 also contributes to quiet operation of the valve in that it cooperates with the opening 8 in the valve seat to gradually restrict the flow and substantially cut it off just before seating of the valve disc 11 occurs thereby eliminating any tendency of the valve disc to flutter.

Thus it will be apparent that a two speed check valve has been provided which is automatic and self-governing in its operation and it has the highly desirable advantage of quick opening and substantially quick closing, but whose final closing movement is regulated so as to eliminate sudden closing of the valve with its accompanying hammering and line shock.

This application is a division of my copending application Serial No. 332,823, filed May 1, 1940, and entitled "Check valves."

It will be understood that the principles of the invention may be embodied in valves different from that illustrated herein without departing from the spirit of the invention and the scope of the appended claims.

I claim:

1. In a check valve comprising a body, a flexible diaphragm for controlling the flow of fluid through said body, and a pressure chamber for operating fluid above said diaphragm, said diaphragm being arranged to be actuated downwardly to effect cessation of flow through said body; a valve stem connected to said diaphragm; a guide in said body for said valve stem, said guide being hollow and having port means for the passage of fluid thereinto, said valve stem having a passageway communicating with said guide and said pressure chamber for conducting fluid from said guide to said pressure chamber to effect closing of said valve; and means cooperable with the passageway in said valve stem for decreasing the flow of fluid thereinto as said valve stem nears the end of its closing movement.

2. In a check valve comprising a body, a flexible diaphragm for controlling the flow of fluid through said body, and a pressure chamber for operating fluid above said diaphragm; a valve stem connected to said diaphragm; a guide in said body for said valve stem, said guide being hollow and having port means for the passage of fluid thereinto, said valve stem having a passageway communicating with said guide and said pressure chamber for conducting fluid from said guide to said pressure chamber; and an adjustable needle valve cooperable with the passageway in said stem for decreasing the flow of fluid to said pressure chamber as said valve stem approaches the limit of its closing movement.

3. A check valve comprising: a body having inlet and outlet openings; a seat between said openings; a flexible diaphragm cooperable with said seat for controlling the flow of fluid between said openings, said body having a pressure chamber for operating fluid above said diaphragm; a reciprocable valve stem connected with said diaphragm and extending through said seat; said valve stem having a passageway communicating with one of said openings and said pressure chamber for conducting fluid from said one opening to said pressure chamber to effect closing of said valve; and means cooperable with the passageway in the lower end of said valve stem for decreasing the flow of fluid thereinto as said valve stem nears the end of its closing movement.

4. A check valve comprising: a body having inlet and outlet openings; a seat between said opening; a flexible diaphragm cooperable with said seat for controlling the flow of fluid between said openings, said body having a pressure chamber for operating fluid above said diaphragm; a reciprocable valve stem connected with said diaphragm and extending through said seat, said valve stem having a passageway communicating with said outlet opening and said pressure chamber for conducting fluid from said outlet opening to said pressure chamber; and an adjustable needle valve carried by said body below said stem and in alignment with said passageway in said stem for decreasing the flow of fluid to said pressure chamber as said valve stem approaches the limit of its closing movement.

5. A check valve comprising: a body having inlet and outlet openings; a seat between said openings; a flexible diaphragm cooperable with said seat for controlling the flow of fluid between said openings, said body having a pressure chamber for operating fluid for said diaphragm; a reciprocable valve stem connected with said diaphragm and extending through said seat, said valve stem having a passageway communicating with said outlet opening and said pressure chamber for conducting fluid from said outlet opening to said pressure chamber; and means carried by said body below said valve stem arranged to be received in said passageway in said valve stem for decreasing the flow of fluid to said pressure chamber as said valve stem approaches the limit of its closing movement.

DONALD G. GRISWOLD.